3,546,345
METHOD FOR CONTROLLING RICE BLAST
Teruzo Asahara, Tokyo, Jiro Hirano, Ichikawa, and Masaru Kado, Shimizu, Japan, assignors to Nippon Oils and Fats Company Limited and Kumiai Chemical Industries Co., Ltd., both of Tokyo, Japan
No Drawing. Filed Sept. 16, 1966, Ser. No. 579,823
Int. Cl. A01n 9/00, 9/12
U.S. Cl. 424—336                                          4 Claims

ABSTRACT OF THE DISCLOSURE

A method for protecting rice plant from fungus attacks which comprises using a fungicidally effective amount of a compound having the general formula $$[Cl_mCCH_{m-1}(CH_2)_n]_2S_x$$

wherein $x$ is an integer of 1 or 2, $m$ is an integer of 2 or 3 and $n$ is an integer of 1, 3, 5 or 7.

The present invention relates to a method of preventing plant disease by using an effective amount of at least one compound having the general formula $$[Cl_mCCH_{m-1}(CH_2)_n]_2(S)_x$$

wherein $x$ represents an integer of 1 and 2, $m$ represents an integer of 2 and 3 and $n$ represents an integer of 1, 3, 5 and 7.

The present invention can be applied to the prevention of various diseases of agricultural plants as well as rice blast (*Piricularia oryzae*) which is the most hazardous pest in rice plant. In order to prevent the rice blast, organomercury compounds such as phenyl mercuric acetate, phenyl mercuric iodide have been used previously.

However, organomercury compounds are harmful to human body directly when spreading them and involve big problems on human (or public) health after spread in rice field, because mercury remains in hull.

The inventors have synthesized a large number of organocompounds having no heavy metals, and investigated with respect to the fungicidal activity of these compounds and have found the compounds having the above general formula which can be easily synthesized by telomerization of ethylene and carbon tetrachloride. These compounds have not only an excellent fungicidal activity but also a less danger of phytotoxicity and a low poison to human body, which is an essential requirement for fungicide for agriculture, so that these compounds can be used safely.

As the compound used in the present invention, mention may be made of (1) bis(3,3-dichloro-2-propenyl)sulfide
(2) bis(5,5-dichloro-4-pentenyl)sulfide
(3) bis(3,3,3-trichloropropyl)sulfide
(4) bis(5,5,5-trichloroamyl)sulfide
(5) bis(7,7-dichloro-6-heptenyl)sulfide
(6) bis(7,7-dichloro-6-heptenyl)disulfide
(7) bis(9,9-dichloro-8-nonenyl)sulfide
(8) bis(9,9-dichloro-8-nonenyl)disulfide A method of producing these compounds is as follows: $\alpha,\alpha,\alpha,\omega$-Tetrachloroalkane ($Cl_3CCH_2(CH_2)_nCl$) obtained by telomerization of ethylene and carbon tetrachloride is subjected to eliminate of hydrogen chloride by means of Friedel-Crafts catalysts to obtain $\alpha,\alpha,\omega$-trichloroalkene ($CCl_2=CH(CH_2)_nCl$). Then, to said trichloroalkene or tetrachloroalkane is added sodium sulfide or sodium polysulfide in water-containing alcohol and the resulting mixture is heated at 80° C. for several hours while stirring to form bissulfide or bispolysulfide.

According to the invention, the above described compound and a carrier are mixed and the mixture is diluted and then spread. The term "carrier" used herein means a carrying agent used for transferring the above described compound to desired area, which may be solid or liquid. For example, as the solid carrier, mention may be made of various clays, pyrophillite, talc, diatomaceous earth, silica, etc. As the liquid carrier, use may be made of a solvent for the compound according to the invention, such as, benzene, xylene, cyclohexanone, the other hydrocarbons, surface active agent, etc., and liquids which can disperse or dissolve the compound according to the invention by means of additives, even if it is non solvent, for example, water.

The invention will be further explained in detail with reference to the following examples.

EXAMPLE 1

Prevention by means of powder

To 3% by weight of bis(5,5-dichloro-4-pentenyl)sulfide were added 30% by weight of kaolin, 62% by weight of talc and 5% by weight of diatomaceous earth and the resulting mixture were milled. The obtained powder was spread by a duster.

EXAMPLE 2

Prevention by means of powder

To 3% by weight of bis(7,7-dichloro-6-heptenyl)sulfide was added 97% by weight of a mixture of kaolin and diatomaceous earth and the resulting mixture was milled. The obtained powder was spread by a duster.

EXAMPLE 3

Prevention by means of wettable powder

To 10% by weight of bis(5,5,5-trichloroamyl)sulfide were added 10% by weight of diatomaceous earth, 75% by weight of kaolin and 5% by weight of wettable agent of Solpole (trade name, made by Toho Kagaku K.K.) and the resulting mixture was milled. The obtained powder was suspended in water to a concentration of 0.03 to 0.05% (based on the active ingredient) and the resulting suspension was spread.

EXAMPLE 4

Prevention by means of wettable powder

Twenty percent by weight of bis(9,9-dichloro-8-nonenyl)disulfide, 75% by weight of a mixture of diatomaceous earth and talc, 2% by weight of sodium alkylbenzene-sulfonate and 3% by weight of sodium dinaphthylmethane disulfonate were mixed and milled and the resulting powder was suspended in water to a concentration of 0.03 to 0.05% (based on the active ingredient), which was spread.

EXAMPLE 5

Prevention by means of emulsifiable concentrate

Twenty percent by weight of bis(7,7-dichloro-6-heptenyl)disulfide, 70% by weight of xylene and 10% by weight of an emulsifier of Solpole were mixed and dissolved and the resulting solution is diluted by water to 400 to 600 times, and the diluted solution was spread.

In order to show the activity of the present invention, the experimental results for fungicide are shown.

EXPERIMENTAL EXAMPLE 1

Test for preventing rice blast

Paddy land rice (species, Aichi Asahi) was planted in a pot having a diameter of 12 cm., in each pot 20 seeds being seeded. At the 4-leaf stage of the rice a suspension of conidium of rice blast taken from the diseased leaves was sprayed and inoculated on the plant. After two days a suspension in which 10% of the wettable powder as described in Example 3 was diluted to 100 times, was spread. Five days after the inoculation, the number of cure or stop of the diseased spots and the proceeding diseased spots were determined respectively. A rate of the number of the proceeding diseased spots per number of the total diseased spots was calculated.

| Active ingredient | Concentration (p.p.m.) | The rate of the proceeding diseased spots per total diseased spots |
|---|---|---|
| Bis(3,3-dichloro-2-propenyl) sulfide | 1,000 | 63.2 |
| Bis(5,5-dichloro-4-pentenyl) sulfide | 1,000 | 11.3 |
| Bis(5,5,5-trichloroamyl)sulfide | 1,000 | 23.7 |
| Phenyl mercuric acetate (PMA) (comparing agent) | 50 | 100.0 |
| Nonspread | | 100.0 |

EXPERIMENTAL EXAMPLE 2

Test for preventing rice blast (determination of $LD_{90}$ of spore germination by using Petri dish)

A given amount of solution of each compound in acetone was dropped to a small Petri dish (inner diameter: 4.2 cm.) and acetone was evaporated at room temperature. After evaporation, 5 ml. of Hopkins' culture liquid which promote germination of rice blast spore and 1 ml. of suspension of rice blast spore were dropped to the Petri dish.

After the spores were dispersed homogeneously in the Petri dish, the Petri dish was left to stand in a thermostat at 28° C. for 24 hours and the result was determined by a microscope. Amounts of the active ingredients showing 90% of prevention of spore germination ($\mu g./cm.^2$) were calculated, which were $LD_{90}$ of the compound.

Compound: $LD_{90}$ ($\mu g./cm.^2$)
- Bis(3,3-dichloro-2-propenyl)sulfide __ 7.25
- Bis(7,7-dichloro-6-heptenyl)sulfide __ 0.25
- Bis(7,7-dichloro-6-heptenyl)disulfide __ 0.45
- Bis(9,9-dichloro-8-nonenyl)sulfide __ 1.0
- Bis(9,9-dichloro-8-nonenyl)disulfide __ 7.25
- PMA (comparing agent) __ 0.02

EXPERIMENTAL EXAMPLE 3

Test for preventing rice blast and phytotoxicity

Paddy land rice (species, Aichi Asahi) was planted in a pot having a diameter of 15 cm. and at the young ears formation stage of the rice, the fungicidal compositions of the invention were spread. On the next day, a suspension of rice blast spores taken from the diseased leaves was spread and inoculated on the rice. One week after the inoculation, the number of diseased spots on the upper leaves was examined. The average values of three groups were shown in the following table.

| Compound | Concentration (p.p.m.) | Number of diseased spots | Phytotoxicity |
|---|---|---|---|
| Bis(7,7-dichloro-6-heptenyl)-sulfide | 1,000 | 4 | |
| Bis(7,7-dichloro-6-heptenyl)disulfide | 1,000 | 18 | |
| Bis(9,9-dichloro-8-nonenyl)-sulfide | 1,000 | 32 | |
| Bis(9,9-dichloro-8-nonenyl)-disulfide | 1,000 | 44 | |
| Bis(3,3-dichloro-2-propenyl)-sulfide | 1,000 | 28 | |
| Bis(5,5-dichloro-4-pentenyl)-sulfide | 1,000 | 17 | |
| Bis(3,3,3-trichloropropyl)-sulfide | 1,000 | 26 | |
| Bis(5,5,5-trichloroamyl)-sulfide | 1,000 | 19 | |
| Nonspread | | 122 | |

Furthermore, the compositions were formulated in the form of emulsifiable concentrates from each compound as described in Example 5, which were diluted with water and then used.

We claim:

1. A method for controlling rice blast on a rice plant comprising applying to the plant to be protected a rice blast controlling amount of a compound having the formula $$[Cl_3CCH_2(CH_2)_n]_2S$$

wherein $n$ is an integer selected from the group consisting of 1, 3, 5 and 7.

2. A method for controlling rice blast on a rice plant comprising applying to the plant to be protected a rice blast controlling amount of a compound having the formula $$[Cl_2C{=}CH(CH_2)_n]_2S$$

wherein $n$ is an integer selected from the group consisting of 1, 3, 5 and 7.

3. A method for controlling rice blast on a rice plant comprising applying to the plant to be protected a rice blast controlling amount of a compound having the formula $$[Cl_3CCH_2(CH_2)_n]_2S_2$$

wherein $n$ is an integer selected from the group consisting of 1, 3, 5 and 7.

4. A method for controlling rice blast on a rice plant comprising applying to the plant to be protected a rice blast controlling amount of a compound having the formula $$[Cl_2C{=}CH(CH_2)_n]_2S_2$$

wherein $n$ is an integer selected from the group consisting of 1, 3, 5 and 7.

References Cited

UNITED STATES PATENTS

| | | | |
|---|---|---|---|
| 2,560,421 | 7/1951 | Eby | 167—22X |
| 2,908,717 | 10/1959 | Johnson | 167—22X |
| 3,156,611 | 11/1964 | Weil et al. | 167—22 |
| 3,179,556 | 4/1965 | Williamson et al. | 167—22 |
| 3,185,620 | 5/1965 | Goodhue et al. | 167—22 |
| 3,189,519 | 6/1965 | Aichenegg et al. | 167—22 |
| 3,209,036 | 9/1965 | Hauptschein | 167—22X |
| 3,256,328 | 6/1966 | Hauptschein et al | 167—22X |

ALBERT T. MEYERS, Primary Examiner

D. R. ORE, Assistant Examiner

U.S. Cl. X.R.

424—337, 357